Figure 1:
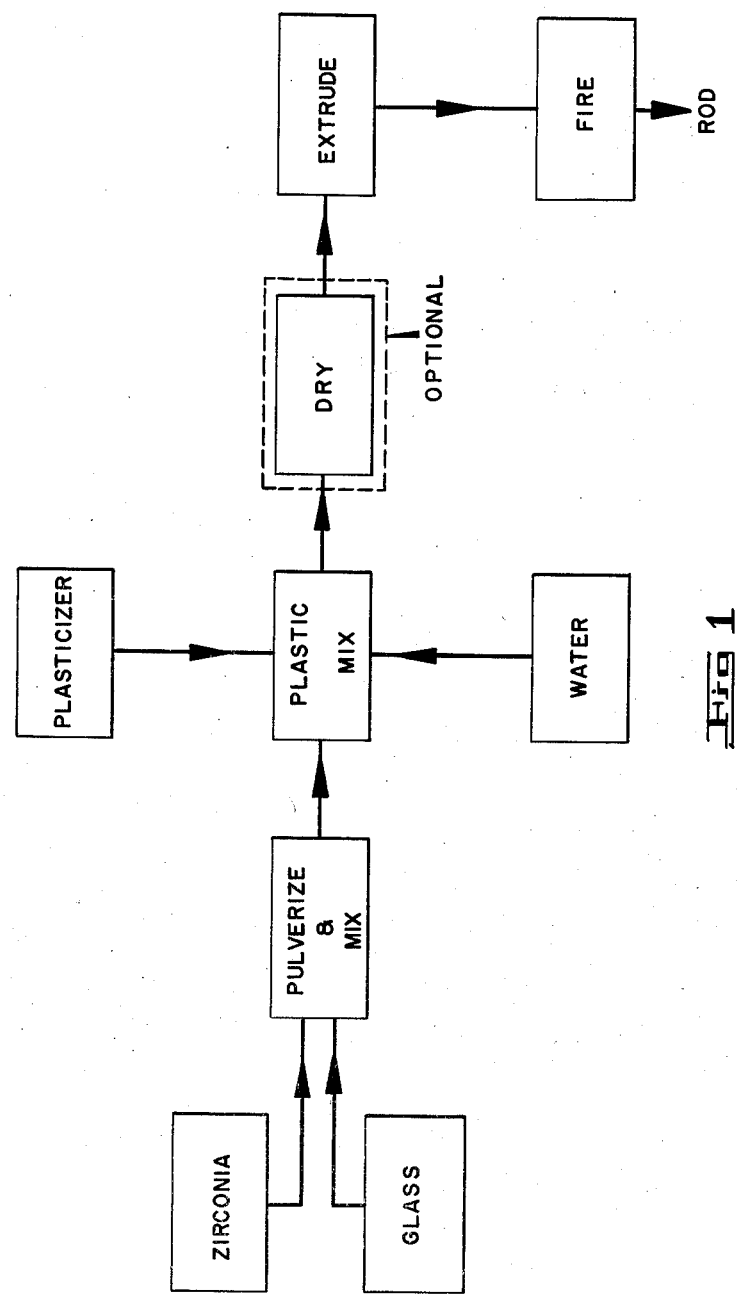

June 22, 1965     T. VASILOS     3,190,769

MEANS FOR AND METHOD OF MAKING ZIRCONIA GLASS COATINGS

Original Filed May 2, 1960

THOMAS VASILOS
INVENTOR.

BY

ATTORNEYS 3,190,769
MEANS FOR AND METHOD OF MAKING
ZIRCONIA GLASS COATINGS
Thomas Vasilos, Winthrop, Mass., assignor to Avco Corporation, Cincinnati, Ohio, a corporation of Delaware
Continuation of application Ser. No. 25,972, May 2, 1960.
This application July 1, 1963, Ser. No. 295,273
4 Claims. (Cl. 117—105.2)

This application is a continuation of co-pending application Serial No. 25,972, filed May 2, 1960, and now abandoned.

This invention relates to wear and chemical resistant coating substances and, in particular, relates to a composition of matter, an article to be used in a flame spraying apparatus, both containing zirconia as a principal constitutent, and methods of making same.

For purposes of this invention the term "flame spraying" defines a process in which a coating material is applied to a substrate as melted droplets or a plastic effluent such as developed in metalizing guns or plasma generators. A well known flame spraying process using a metalizing gun is described in the Wheildon Patent No. 2,707,691.

In the prior art, zirconia has been used as a coating material because it has excellent wear and chemical resistance. It is also a refractory ceramic and as such is used to protect and insulate substrates which cannot be subjected directly to oxidizing atmospheres at high temperatures, molybdenum for example.

It is well known that molybdenum, although it has an extremely high melting point, reacts with oxygen to form oxides which volatilize at relatively low temperatures. Thus, effective use cannot be made of the high temperature properties of the material in oxidizing atmospheres, air for example. The effectiveness of zirconia as a coating for molybdenum and other materials which tend to react with air to form oxides which volatilize at lower temperatures is limited by the fact that the coatings developed through prior art processes are quite permeable, in the order of 10% or greater. Thus, it has been observed, particularly in the case of molybdenum, that the zirconia coating does not prevent interaction between the molybdenum substrate and oxygen. The low temperature oxides formed escape through the pores of the coating and destroy the substrate by decomposition.

A coating composition comprising zirconia and glass has been found to possess very dense microstructures, with little permeability. Permeability of the order of 2% or less has been repeatedly observed. Compositions containing zirconia and glass will be referred to as a two-phase system to differentiate these compositions from prior art zirconia coatings in which the particles of zirconia are bonded to each other by cohesion.

It is an object of the invention to provide a composition of matter comprising two phases, zirconia and glass.

It is another object of the invention to provide a two-phase coating composition having a permeability of 2% or less.

It is still another object of the invention to provide an article to be used for flame spraying a two-phase coating on a substrate and a method of making same.

It is still another object of the invention to provide an article comprising zirconia and glass that is to be used for flame spraying a two-phase coating on a substrate.

It is yet another object of the invention to provide a material comprising at least two constitutents, in which the densities of the constituents are significantly different, that is to be used for flame spraying a coating on a substrate.

In accordance with the invention a wear and chemical resistant composition comprises zirconia particles bonded by glass into an integral rigid structure.

Also in accordance with the invention, a ceramic material to be used for flame spraying comprises a homogeneous mixture of zirconia and glass particles having sufficient mechanical strength for handling.

A process for making a ceramic material adapted for flame spraying comprising pulverizing and mixing zirconia and glass powder until a uniform mixture of zirconia and glass particles having an average particle diameter of 5 to 50 microns results. Water and a plasticizer are then added to the mixture to form a plastic mix. The plastic mix is then placed in an extruding apparatus and extruded to a predetermined shape. After the mix has been shaped, it is fired at 2000 to 2200° F. until it achieves sufficient mechanical strength for handling.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawing, in which:

FIGURE 1 is a block flow diagram outlining the steps in a preferred process for forming a zirconia article to be flame sprayed onto a substrate. The flow diagram incorporates the teachings of the present invention.

An effective method of producing a zirconia glass coating composition is by the use of a flame spraying apparatus in which a chemical fuel is burned to heat the material supplied to the apparatus. The material is melted and sprayed in the form of droplets onto a substrate. One such apparatus is described in the aforementioned Wheildon patent. This patent also mentions a zirconia coating. It is significant, however, that none of the compositions disclosed in this patent including zirconia, comprise two-phase systems. An important problem in spraying two-phase systems is the tendency for the particles having different densities to be segregated in the effluent. Thus, a uniform mixture of particles inserted into the flame spraying apparatus is deposited as a nonuniform coating.

The most convenient form of coating material fed to spraying apparatus is a rod. Accordingly, for purposes of illustration but not of limitation, the formation of a two-phase rod will be described herein.

Experiments have shown that an impervious or non-porous coating, one containing less than 2% voids, results where zirconia particles deposited on a substrate are bonded together by a glass material. To some extent the glass contributes to the bond between the coating and the substrate. Tests have shown that a borosilicate glass produces the most effective—least permeable—composition. However, coating compositions in which the zirconia is bonded with lead, soda lime or high silica glasses are also characterized by very dense microstructures with very little interconnected porosity.

A zirconia and glass rod such as may be used in the Wheildon apparatus may be formed by first pulverizing and mixing zirconia and glass powder until a uniform mixture of zirconia and glass particles having an average particle diameter of 5 to 50 microns results. The preferred proportion of zirconia to glass is 80%:20% by weight respectively. Proportions of 60 to 85% zirconia to 40 to 15% glass have also provided low porosity coatings. This may be done in a ball mill or any other suitable equivalent apparatus.

To prepare the mixture of glass and zirconia for extrusion, water and a plasticizer are added to the mixture of zirconia and glass particles to form a plastic mix. A plasticizer blend which was found to be very satisfactory comprises 1% ammonium alginate and 1% diglycol stearate blended with 15% water in a muller type mixer such as type PC-290 Mixer. The percentages are by weight and refer to percentages of the combined weight of the zirconia and glass mixture.

The next step is to form the plastic mix into a desired shape. Extrusion is the preferred forming process. The plastic mix with a constituency suitable for extrusion, now comprising zirconia, glass, plasticizer and 15% water, is fed to an extruder press and extruded as a rod. The rod, however, lacks mechanical strength and accordingly, the extruded rod is placed in an oven and fired, sintered, off the water and plasticizer contained therein. Preferably the extruded rod is fired at 2000 to 2200° F. which is slightly above red heat for the mixture, 1000 to 1200° F, but well below the melting point of zirconia, 4800.

An alternate process for preparing the plastic mix for extrusion was found to be extremely helpful where a mulling mixer of the type mentioned is not available. The alternate process provides for using an excess of water, about 40%, in making the plastic mix. The excess water greatly simplifies the process of mixing the plasticizer with the zirconia and glass, and a uniform mix then can be easily formed.

Since the plastic mix containing 40% water is not suitable for extrusion, it is placed in a drying oven prior to the extrusion step, to reduce the water content of the plastic mix to approximately 15%. At this point the mix has a suitable constituency for extrusion. Referring to FIGURE 1, it will be noted that the drying step is shown as an optional step, and as discussed above is performed where an excess of water is used to make the plastic mix.

The zirconia and glass, after firing, develops a strong adhesive bond resulting from a partial interaction between the zirconia and glass. The extent of the interaction between the zirconia and glass is small and the rod is preserved as a two-phase substance. When the rod is fed through the metalizing gun and sprayed to form a coating composition the bond formed during the firing procedure is of sufficient strength to prevent segregation of the glass and the zirconia, because of their significantly different densities, when the effluent, comprising zirconia and glass, is applied to the substrate. The glass phase is sufficiently fluid in the effluent so that its impact on the substrate causes it to spread out and envelop the zirconia particles. The coating composition is then cooled, completing the process. The zirconia particles are bonded by the glass into an integral rigid structure.

The two-phase coating composition discussed in this application was found to have at least as tenacious a bond to the substrate as that of the zirconia material alone. Furthermore, the permeability of the two-phase coating composition was at least five times less than the permeability of single phase zirconia coating. In substantially all cases the permeability was less than 2%.

The various features and advantages of the invention are thought to be clear from the foregoing description. Various other features and advantages not specifically enumerated will undoubtedly occur to those versed in the art as likewise will many variations and modifications of the preferred embodiment illustrated, all of which may be achieved without departing from the spirit and scope of the invention as defined by the following claims.

I claim:

1. A rod for flame spraying to coat articles comprising essentially zirconia and glass particles in the proportions of 60–85% zirconia and the balance 40–15% borosilicate glass, respectively, by weight, said particles being sintered into an integral rigid structure.

2. A rod for flame spraying to coat articles comprising essentially 80% zirconia and the balance 20% borosilicate glass particles by weight sintered into an integral rigid structure.

3. A rod for flame spraying as described in claim 2 in which said particles have an average diameter of 5–50 microns.

4. A process of making an impervious, substantially zirconia coating on a substrate comprising flame spraying a composite of essentially presintered zirconia and glass particles on said substrate, the zirconia and glass particles being in the proportions of 60–85% zirconia and the balance 40–15% borosilicate glass, respectively, by weight.

References Cited in the file of this patent

UNITED STATES PATENTS

| | | | |
|---|---|---|---|
| 2,204,582 | 6/40 | Donahue | 106—57 |
| 2,707,691 | 5/55 | Wheildon | 117—105.2 |
| 2,876,121 | 3/59 | Ault | 106—57 |
| 2,904,449 | 9/59 | Bradstreet | 117—105.2 |
| 2,997,413 | 8/61 | Wagner | 154—43 |

TOBIAS E. LEVOW, *Primary Examiner.*